United States Patent
Rogers et al.

(10) Patent No.: US 6,755,549 B2
(45) Date of Patent: Jun. 29, 2004

(54) LIGHT EMITTING HANDSET

(75) Inventors: Sean Rogers, San Diego, CA (US); Tom Pitta, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 09/962,058

(22) Filed: Sep. 25, 2001

(65) Prior Publication Data

US 2003/0058657 A1 Mar. 27, 2003

(51) Int. Cl.$^7$ .................................. H04M 1/22
(52) U.S. Cl. .................. 362/88; 362/23; 362/29; 362/30; 362/109; 362/253
(58) Field of Search ................. 362/109, 253, 362/23, 29, 30, 88

(56) References Cited

U.S. PATENT DOCUMENTS

| | | | | |
|---|---|---|---|---|
| 3,821,539 A | * | 6/1974 | Kleinman | 240/6.45 R |
| 4,618,917 A | * | 10/1986 | Lee et al. | 362/88 |
| 5,901,206 A | * | 5/1999 | Soon | 379/110.01 |
| 5,918,188 A | * | 6/1999 | Doran | 455/575 |
| 6,254,249 B1 | * | 7/2001 | Kim et al. | 362/109 |
| 6,341,871 B1 | * | 1/2002 | Angelopoulos | 362/23 |
| 6,474,828 B1 | * | 11/2002 | Chin | 362/88 |
| 6,611,697 B1 | * | 8/2003 | Ewing et al. | 455/575 |

* cited by examiner

Primary Examiner—Sandra O'Shea
Assistant Examiner—Jacob Y. Choi

(57) ABSTRACT

The present invention is a mobile handheld communications devices with a light emitting diode (LED) that outputs sufficient light to illuminate an area external to the case and a switch to control the LED. An LED that outputs sufficient light to illuminate an area external to the case can be added to any mobile handheld communications device, including pagers, telephone handsets, and personal digital assistants (PDAs).

15 Claims, 5 Drawing Sheets

LIGHT EMITTING HANDSET

FIELD

The present invention relates generally to electronics, and more particularly to mobile hand held communications devices.

BACKGROUND

When talking on a mobile handset it can be difficult to perform manual tasks since the user generally can not have both hands free without running the risk of dropping the mobile phone. A particular problem occurs when the user needs to hold another device. In one example, the user may wish to perform tasks that require additional lighting while talking on a mobile phone or using a personal digital assistant (PDA). Such additional lighting may be desirable when performing such tasks as writing directions or reading a map while driving at night, or trying to unlock a door in the dark. While performing these tasks the users will only have one hand free making it difficult to hold both a light and the mobile phone while performing the additional task.

It is common to use a flashlight to perform tasks when additional light is needed. Many flashlights of various sizes and shapes are available and well known, but none of these meet the requirement of being easy to use while talking on a mobile phone and trying to perform manual tasks. In addition, many mobile phone and PDA users may not want to carry a flashlight.

SUMMARY

It is therefor an object of the present invention to provide a handheld communication device or PDA that enables a user to conveniently provide illumination. The present invention provides a handheld device with a lamp positioned to illuminate an area external the handheld device. In one embodiment the lamp is a light emitting diode (LED) constructed to output sufficient light to illuminate an area external to the case and a switch to control the LED. In a preferred embodiment the LED may be a super-bright or ultra-bright LED. The lamp may be added to any mobile handheld communication device, or PDA, including pagers and telephone handsets.

Advantageously, the lamp enables a user to conveniently provide illumination using the handheld device such as a mobile handset or PDA. Accordingly the user may more safely and confidently perform manual tasks while using the handheld device without the risk of holding a flashlight as another light source.

BRIEF DESCRIPTION OF THE DRAWINGS AND TABLES

For a more complete understanding of the present invention and the advantages thereof, reference is now made to the following descriptions taken in conjunction with the accompanying drawings, in which.

Use of the same reference symbols in different figures indicates similar or identical items.

DETAILED DESCRIPTION

Figure 1:
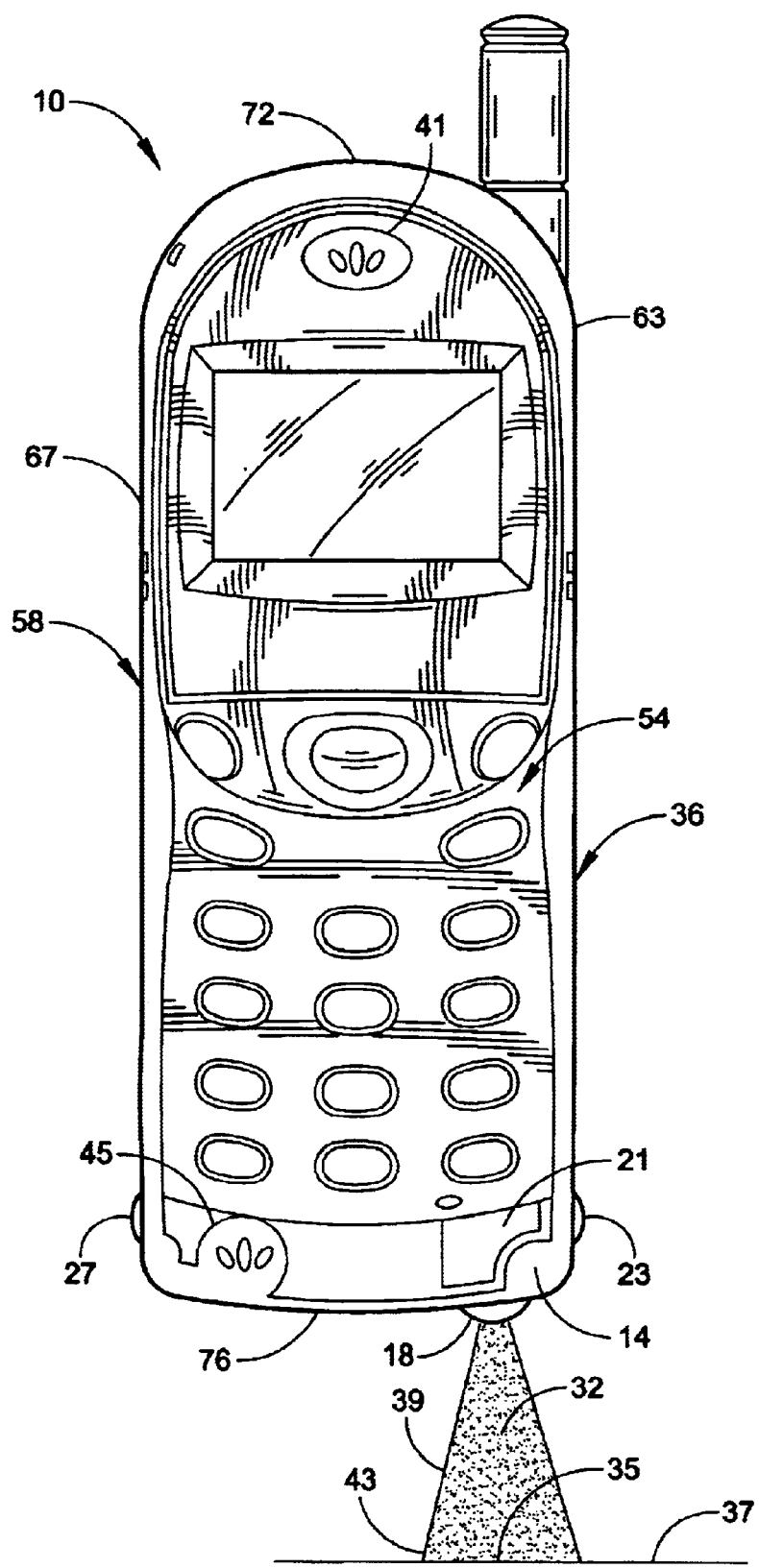
FIG. 1 is a front view of a light emitting handset in the form of, a wireless telephone handset with a light emitting diode (LED) located in the lower portion of the light emitting handset, with a lens in the lower side wall.

Referring now to FIG. 1, an embodiment of the mobile handheld communications device 10 is shown in the form of a light emitting telephone handset. The mobile handheld communications device 10 includes a case 36, a lamp receiving area 21, a lamp in the form of a light emitting diode (LED) 14, and a switch 23 for controlling the LED 14. While FIG. 1 shows a single LED, it will be appreciated that multiple LED's can be used. In FIG. 1 the mobile hand held communications device 10 is a light emitting telephone handset; however, the hand held communications device can be any hand held communications device, such as a pager. Alternatively, the device may be a PDA. It will be appreciated that other handheld portable electronic devices may advantageously be used. The mobile handheld communications device 10 has an upper speaker portion 41, a lower microphone portion 45, and places the LED 14 in the lower microphone portion 45 of the mobile handheld communications device 10. It will be appreciated that the elements may be alternatively arranged on the mobile handheld communications device 10.

Shown on FIG. 1, the case 36 has a top surface 54, a bottom surface 58, a first side wall 63, second side wall 67, an upper side wall 72, and a lower wall 76. Preferably the LED 14 is located on the lower side wall 76 and positioned and aimed relative to the speaker and microphone so that the light beam 32 of the LED 14 points in front of a user when a user is conversing on the mobile handheld communications device 10. More specifically, the light beam 32 points in a direction generally parallel to the top surface 54, the bottom surface 58, the first side wall 63, and the second side wall 67. It will be appreciated that other light beam 32 orientations may be desired for specific applications. The light beam 32 projects on to a target surface 37 creating the illuminated area 43 with a focus area 35 within the focus area.

In one example, a user might try to talk on a phone and unlock a door at the same time. If the LED 14 is located on the lower side wall 76, the user can easily point the light beam 32 in the direction of the door knob while talking on the telephone handset 10. In another example, the device can be used to illuminate a map or other reading or writing surface while talking on the mobile handheld communications device 10.

The switch 23 may be located anywhere on the case 36. In one embodiment the switch 23 is located on the first side wall 63. This location has the advantage of being easily operated by the user's little finger while talking on the phone. Additionally, there may be a second switch 27. The second switch 27 may be located on the second side wall 67. Having a switch on both side walls allows the light to be easily operated by the little finger on either hand. Alternatively, activation of the light source can be based on the depression of an existing key for a minimal dwell time. For example, in one embodiment a user can hold the "*" key for two seconds to activate and deactivate the light.

The LED 14 can be any color available, though white is preferred. In applications where the user wants to maintain night vision several choices are available. Red has traditionally been considered the best choice for retaining night vision, however, many pilots and the military now prefer green. Green is good for maintaining night vision and it does not make it difficult to see red lines on maps and charts. Blue is another possible choice. It is easy on the eyes and can lessen eyestrain. In addition the switch can be adapted to vary the intensity of the LED 14. It will be appreciated that other colors or frequencies may be selected for an aesthetic or application specific purpose.

Figure 1A:
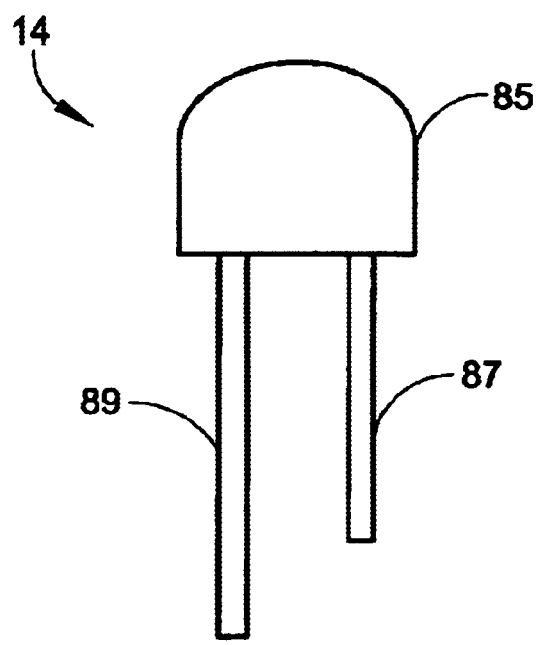
FIG. 1A is a detail view of the LED located in the lower portion of the light emitting handset, with a lens in the lower side wall of the wireless telephone handset.

Referring now in particular to FIG. 1A, a detail view of the LED 14 is shown. The LED 14 includes a first lead 89 and a second lead 87 for supplying power to the LED 14. The mobile handheld communications device 10 preferably has some method of focusing the light from the lamp onto a target surface. In this regard, the LED 14 also includes an encapsulation 85 that acts as a focusing element to concentrate the light into an illuminating beam.

Figure 1B:
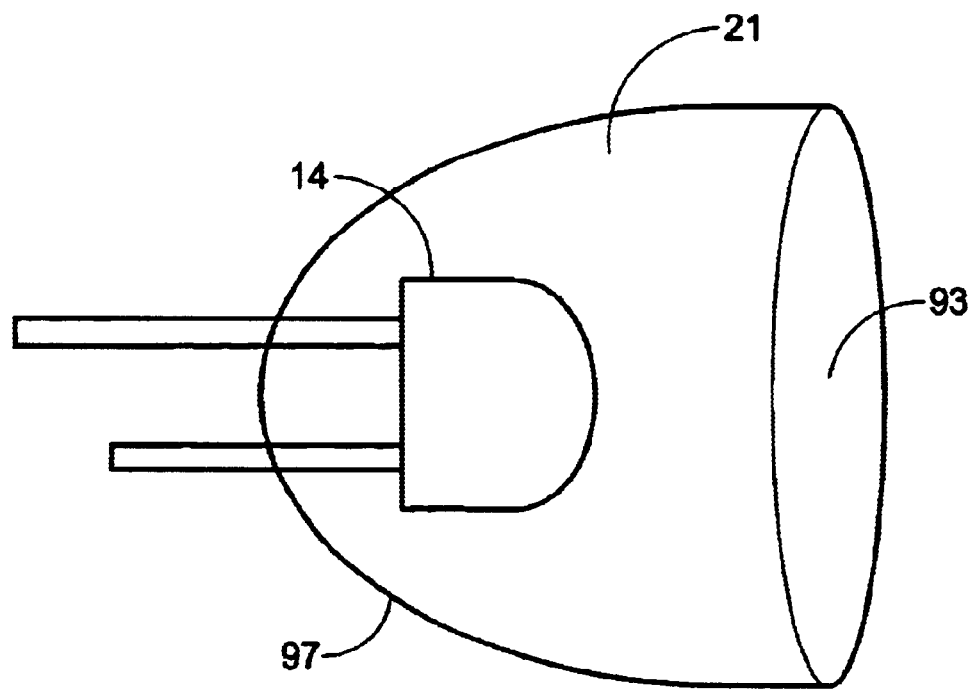
FIG. 1B is a detail view of the LED, lens, and foucusing reflective surface.

Alternatively, the light beam can be focused as shown in FIG. 1B. In FIG. 1B the light can be focused into an illuminating beam by using a lens 93 or by using a focusing reflective surface 97. The lens 93 or the focusing reflective surface 97 may be built into the lamp or external to the lamp. The light can also be focused by some combination of lens 93 and focusing reflective surface 97 built into the lamp and external to the lamp including multiple lenses 93 and multiple focusing reflective surfaces 97. FIG. 1B also shows the lamp receiving area 21. The lamp receiving area 21 is a portion of the mobile handheld communications device 10 adapted to accept the lamp.

The lamp, in this case an LED 14, should be able to create a focus pattern of sufficient strength to illuminate a portion of the target surface at a useful distance. Sufficient strength would be enough light to enable a person to visibly perceive the illuminated area in otherwise dimly lit environment. Accordingly the person is able to perform tasks with the additional illumination provided by the beam. Examples would include the ability to enable a user to identify a key hole or the ability to read twelve point font on a map. Depending on the application, useful distance would be between one and four feet.

As shown in FIG. 1, a lens 18 may be added for three purposes, to focus the light beam 32, to protect the lamp, and to change the color of the light beam 32 by the mobile handset.

Figure 2:
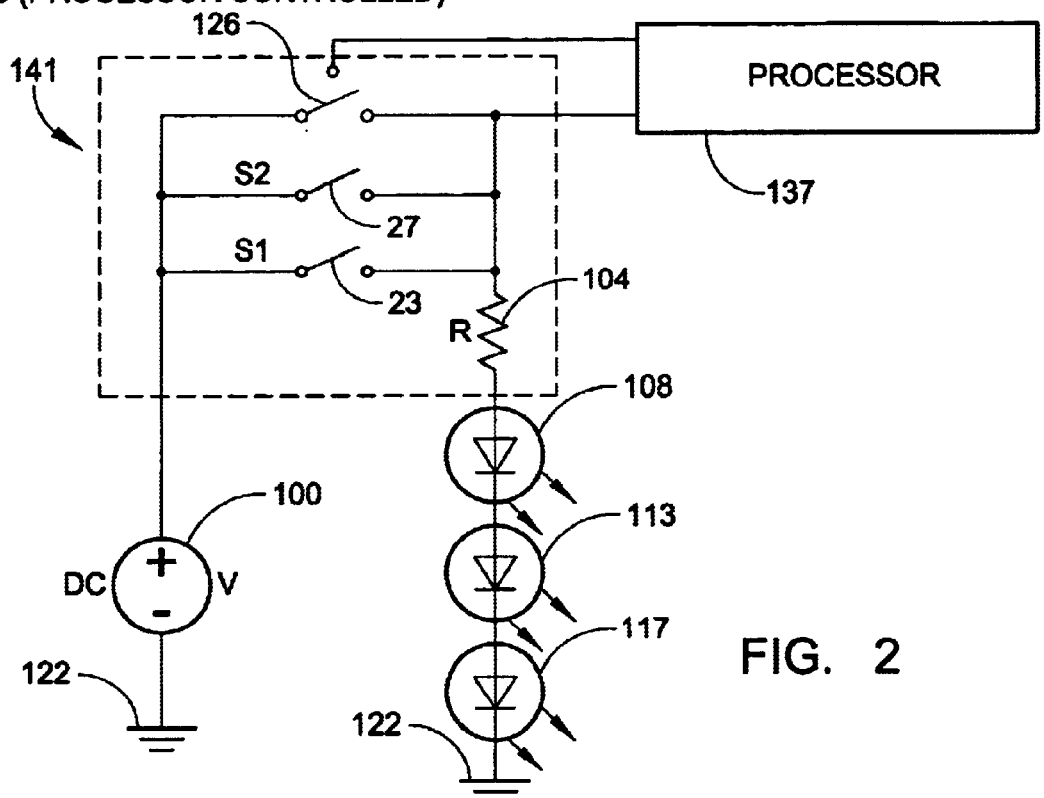
FIG. 2 is a circuit diagram showing an embodiment of the light emitting handset wherein multiple LED's are driven by a power supply.

Referring now in particular to FIG. 2, a circuit diagram for an embodiment wherein multiple LED's are driven by a power supply will be discussed. This embodiment may be preferable in power sensitive applications. As the number of LED's increase the power consumed in the resistor decreases. It will be appreciated by one skilled in the art that the number of LED's can not be increased without bound and that the resistance of the resistor 104 will need to be lowered as the number of LED's is increased.

FIG. 2 shows a power source 100 coupled to several switches 23, 27, 126 and ground 122. The power source 100 supplies power to a resistor 104 and several LED's 108, 113, 117 that are coupled to ground 122. When at least one of the switches 23, 27, 126 are on, current flows through the circuit of FIG. 2. All of the elements in FIG. 2, except the switches 23, 27, 126 are connected in series so that the voltage drop across the resistor 104 is minimized. This minimizes the power consumed by the resistor 104.

It is possible for a single switch 23 to be used to control the LED. This would be less expensive than having two or more switches 23, 27, 126. But multiple switches may provide greater flexibility and utility. Additionally, having a single switch would require fewer openings in the case 36. It will be appreciated that other switch arrangements may be used.

FIG. 2 also shows a processor 137. A program adapted to run on the processor 137 may be incorporated to control the switch 126 that turns the LED's 108, 113, 117 on and off. If a processor 137 is used software settings can be used to enable the LED's 108, 113, 117. Through the use of a processor 137 many different features are possible, for example, the LED's 108, 113, 117 can be turned on for a predetermined amount of time, the LED's 108, 113, 117 can be turned on at a predetermined time, or the processor can be used to flash the LED's 108, 113, 117 on and off. In addition, the intensity of the LED can be adjusted by varying the on-off duty cycle produced by the processor. One of the benefits of this is power consumption can be reduced. FIG. 2 also shows circuitry detail 141. Circuitry detail 141 will be described further with reference to FIG. 5. It will be apparent by one skilled in the art that the processor 137 could be a microprocessor, a microcontroller, a programmable logic device, an application-specific integrated circuit (ASIC), or discrete components.

Figure 3:
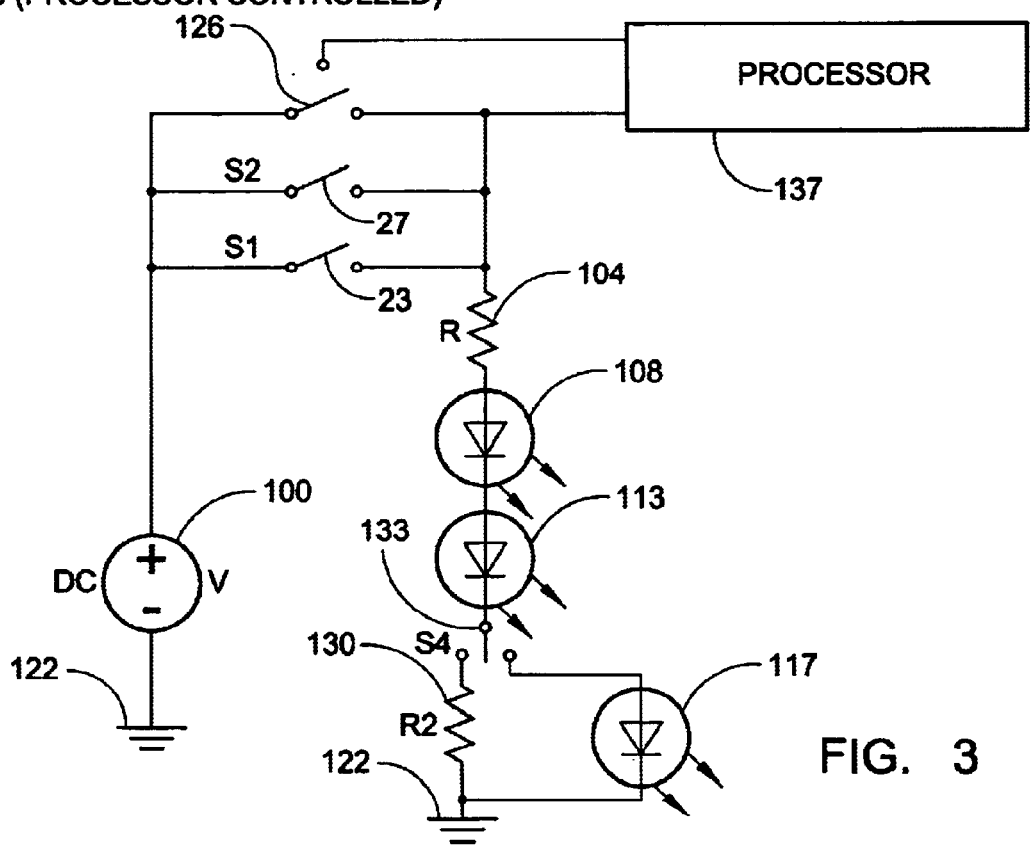
FIG. 3 is a circuit diagram for another embodiment of the light emitting handset wherein one LED is capable of being turned off independent of another LED.

Referring now in particular to FIG. 3, a circuit diagram for an embodiment wherein LED's 108, 113, 117 are driven by a power supply 100 with one LED 117 capable of being turned off separate from the other LED's 108, 113 will be discussed. FIG. 3 is similar to FIG. 2. Two components have been added. A fourth switch 133 connected to LED's 113, 117 and resistor 130 coupled to ground 122 and the forth switch 133. This embodiment allows one of the LED's 117 to be turned off while the other two are on. It will be appreciated by one skilled in the art that many different circuit configurations are possible.

Figure 4:
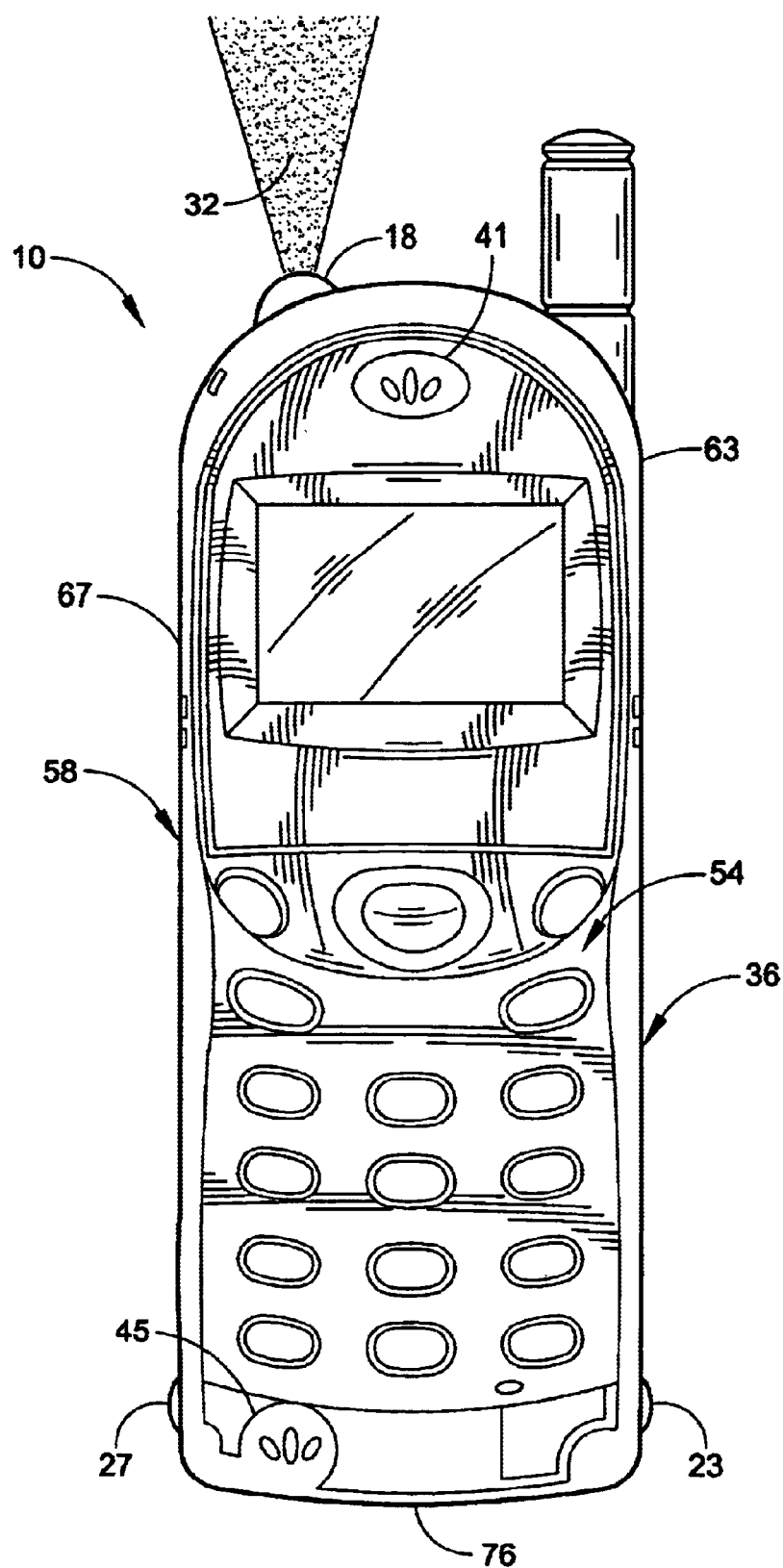
FIG. 4 is a front view of a light emitting handset in the form of a telephone handset with an LED located in the upper side wall.

Referring now in particular to FIG. 4, an embodiment showing a mobile handheld communications device will now be described. FIG. 4 shows an embodiment wherein the LED 14 is located in the upper speaker portion 41 of the telephone hand set 10. This embodiment would be preferred for applications where the telephone handset 10 is going to be used as a flashlight while not being used as a telephone. The user would have a tendency to hold the telephone handset 10 in their hand in the same orientation as when they talk on the telephone. With the LED 14 in the top of the telephone handset 10 the user can easily point the light in the direction desired by pointing their arm in the direction that they want the light to point. It will be understood that the telephone handset 10 may be any mobile handheld communications device or PDA.

Figure 5:
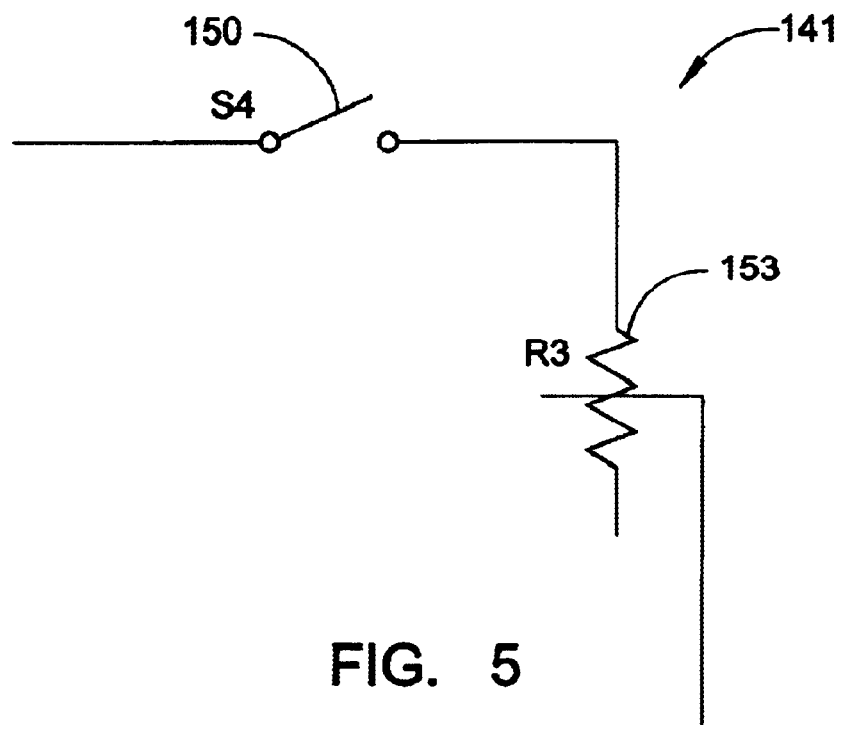
FIG. 5 is a circuit diagram for another embodiment of the light emitting handset wherein the intensity of the LED can be varied.

Referring now in particular to FIG. 5, a circuit diagram showing circuit detail 141 for an embodiment wherein the switches 23, 27, 126 are replaced by a switch 150 and the resistor 104 is replaced by a potentiometer 153 configured to vary the intensity of the LED's 108, 113, 117. As the resistance is changed the intensity of the LED's 108, 113, 117 will change.

Figure 6:
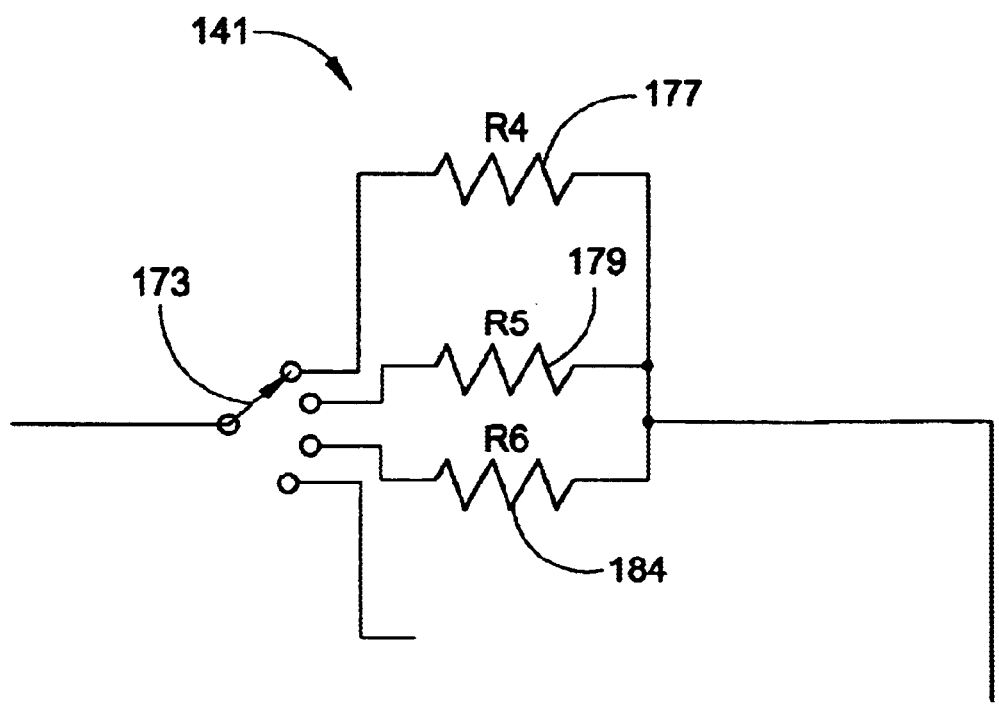
FIG. 6 is a circuit diagram for another embodiment of the light emitting handset wherein the intensity of the LED can be varied by using multiple resistors.

Referring now in particular to FIG. 6, a circuit diagram showing circuit detail 141 for an embodiment wherein the switches 23, 27, 126 are replaced by a selector switch 173 and resistor 104 is replaced by several resistors 177, 179, 184. Each resistor 177, 179, 184 can be a different value. The resistor 177, 179, 184 selected by the selector switch 173 determines the intensity of the LED 14. FIG. 6 shows an example with a selector switch capable of selecting one of three resistors. In theory any plurality of resistors is possible. Some limitations on the number of resistors used include the availability of a selector switch 173 with the desired number of selections, and space constraints of the mobile communications device.

The description and drawings contained herein are particular embodiments of the invention and are representative of the subject matter broadly contemplated by the invention. However, the invention encompasses other embodiments that will be apparent to those skilled in the art. Accordingly, the scope of the invention is limited only by the appended claims.

What is claimed is:

1. An improvement of a mobile handheld communication device wherein the device comprises a case including an upper speaker portion, a lower microphone portion, a first side wall, a second side wall, and a lower wall, the improvement comprising:
   a lamp receiving area on the case;
   a lamp including a LED positioned in the lamp receiving area generating a light beam along a light beam path,
   a focusing element for directing the light beam along the light path; wherein, the lamp and focusing element cooperate to provide a focus pattern in the light beam; and the focus pattern is of sufficient strength to illuminate a portion of a target surface;
   an actuatable switch positioned in at least one of the first side wall and the second side wall adjacent the lower wall and the lower microphone portion to be actuated by a user's little finger to actuate the lamp and vary the intensity of the lamp;
   a microprocessor controlling an on-off duty cycle of the lamp; and
   a program to run on the processor to control the switch.

2. The improvement of claim 1, wherein the focusing element is internal to the light emitting diode.

3. The improvement of claim 1, wherein the light emitting diode is a super-bright light emitting diode.

4. The improvement of claim 1, wherein the switch is located on the case.

5. The improvement of claim 1, wherein the light emitting diode is an ultra-bright light emitting diode.

6. The improvement of claim 1, wherein the device is constructed as a pager.

7. The improvement of claim 1, wherein the device is constructed as a telephone handset.

8. The improvement of claim 3, wherein: the device has a housing further comprising a generally rectangular shape with a top surface, a bottom surface, a first side wall, a second side wall, an upper wall and a lower wall; the LED is located in the lower wall; and the switch comprises a pushbutton switch that is located on the first side wall.

9. The improvement of claim 4, wherein the switch comprises a second pushbutton switch that is located on the second side wall.

10. An improvement to a handheld personal digital assistant device wherein the device comprises a case including an upper speaker portion, a lower microphone portion, a first side wall, a second side wall, and a lower wall, the improvement comprising:
    a light emitting diode (LED) receiving area on the case;
    a LED positioned in the LED receiving area generating a light beam along a light beam path,
    a focusing element for directing the light beam along the light path; wherein, the LED and focusing element cooperate to provide a focus pattern in the light beam; and the focus pattern is of sufficient strength to illuminate a portion of a target surface;
    an actuatable switch adapted to control the LED, the actuatable switch positioned in at least one of the first side wall and the second side wall adjacent the lower wall and the lower microphone portion to be actuated by a user's little finger to actuate the LED and vary the intensity of the LED;
    a microprocessor controlling an on-off duty cycle of the LED; and
    a program to run on the processor to control the switch.

11. The improvement of claim 10 wherein the device further comprises: a lens in the illumination path and capable of passing at least one of a plurality of light frequencies.

12. The improvement of claim 10 wherein the lamp further comprises a lens adapted to focus a light beam on the area external to the case.

13. The improvement of claim 10, wherein the switch is located on the case.

14. The improvement of claim 10 wherein the lamp comprises a plurality of LED's.

15. A method of illuminating a target surface with a mobile handheld communication device, comprising:
    providing a mobile handheld communication device having a case with an upper speaker portion, a lower microphone portion, a first side wall, a second side wall, and a lower wall, a lamp including a LED carried by the case to generate a light beam along a light beam path, an actuatable switch positioned in at least one of the first side wall and the second side wall adjacent the lower wall and the lower microphone portion to be actuated by a user's little finger to actuate the lamp and vary the intensity of the LED; a microprocessor controlling an on-off duty cycle of the LED; and a program to run on the processor to control the switch.;
    aiming the lamp of the mobile handheld communication device at a target surface;
    actuating the actuatable switch positioned in at least one of the first side wall and the second side wall adjacent the lower wall and the lower microphone portion with a user's little finger;
    illuminating the target surface with the mobile handheld communication device.

* * * * *